(12) United States Patent
Isley et al.

(10) Patent No.: US 6,532,901 B2
(45) Date of Patent: Mar. 18, 2003

(54) ANIMAL MONITORING SYSTEM

(76) Inventors: Henry A. Isley, 2065 Knight St., Creedmoor, NC (US) 27522; Steven J. Isley, 4520B Townsville Rd., Bullock, NC (US) 27507

( * ) Notice: Subject to any disclaimer, the term of this patent is extended or adjusted under 35 U.S.C. 154(b) by 0 days.

(21) Appl. No.: 09/875,589

(22) Filed: Jun. 6, 2001

(65) Prior Publication Data

US 2001/0050062 A1 Dec. 13, 2001

Related U.S. Application Data

(60) Provisional application No. 60/209,972, filed on Jun. 8, 2000.

(51) Int. Cl.[7] ............................................. A01K 29/00
(52) U.S. Cl. ..................... 119/712; 119/174; 119/421
(58) Field of Search .............................. 119/712, 720, 119/721, 174, 421; 340/573.1, 575, 573.3

(56) References Cited

U.S. PATENT DOCUMENTS

| | | |
|---|---|---|
| 3,533,095 A | 10/1970 | Collins |
| 4,028,687 A | 6/1977 | Hamaguchi et al. .... 340/201 R |
| 4,031,365 A | 6/1977 | Raggiotti et al. ......... 235/151.3 |
| 4,055,839 A | 10/1977 | Skeggs ....................... 340/279 |
| 4,147,160 A | 4/1979 | Aranow et al. ............... 128/28 |
| 4,232,686 A | 11/1980 | Kammlade, Jr. ............. 128/775 |
| 4,312,360 A | 1/1982 | Conway et al. ............. 128/736 |
| 4,377,157 A | 3/1983 | Zartman ..................... 128/1 R |
| 4,387,724 A | 6/1983 | Zartman ..................... 128/736 |
| 4,396,020 A | 8/1983 | Wolff et al. ................. 128/738 |
| 4,651,137 A | 3/1987 | Zartman ..................... 340/573 |
| 4,777,478 A * | 10/1988 | Hirsch et al. ............... 340/521 |
| 5,642,690 A * | 7/1997 | Calabrese et al. .......... 119/721 |
| 5,774,055 A * | 6/1998 | Pomerantz ................. 340/517 |
| 5,905,436 A * | 5/1999 | Dwight et al. .............. 340/522 |
| 6,104,294 A * | 8/2000 | Andersson et al. ......... 119/712 |
| 6,271,757 B1 * | 8/2001 | Touchton et al. ........... 119/721 |
| 6,315,740 B1 * | 11/2001 | Singh ........................ 600/595 |
| 6,339,999 B1 * | 1/2002 | Newell ...................... 119/421 |
| 6,359,564 B1 * | 3/2002 | Thacker ..................... 340/330 |
| 6,388,573 B1 * | 5/2002 | Smith et al. ................ 250/221 |

OTHER PUBLICATIONS

"The Foaling Mare Management Guidelines", MSU Extension Equine Bulletins—78700595, Jan. 1, 1994.*

* cited by examiner

*Primary Examiner*—Charles T. Jordan
*Assistant Examiner*—Kimberly S. Smith
(74) *Attorney, Agent, or Firm*—Coats & Bennett, P.L.L.C.

(57) ABSTRACT

An animal monitoring system comprises a plurality of sensors positioned in a containment area and emitting infrared light across the containment area. A plurality of infrared light-detecting sensors receive said infrared light from said transmitters and provides a signal indicating such reception to a controller. The controller monitors the presence of interruptions in said light beams and infers that, in the presence of said interruptions, the animal is standing. If no interruption is present for a predetermined amount of time, an alarm may be generated to alert an individual monitoring the animal.

6 Claims, 4 Drawing Sheets

ANIMAL MONITORING SYSTEM

The present application claims priority to U.S. Provisional Patent Application Serial No. 60/209,972 filed Jun. 8, 2000 in the name of Henry A. Isley and entitled "ANIMAL DOWN MONITOR." The disclosure of this priority application is incorporated by reference in its entirety.

FIELD OF INVENTION

The present invention relates to a system for detecting when an animal in a contained area is no longer in an upright, standing position.

BACKGROUND OF THE INVENTION

The equine industry is a fragile and volatile industry, having experienced large multi-million dollar purchases of thoroughbred foals, followed by years of economic depression and the selling of many horse farms to placate the demand for urban sprawl. One thing that remains constant in the equine industry, however, is the difficulty with which mares foal and the need for human assistance during the foaling process. Heretofore, an individual must typically remain near the mare during expected foaling times, causing sleep deprivation and precluding their performance of other duties.

As a general rule, horses remain standing throughout most of their normal existence. An exception to this rule is during the foaling process, when the horse in question will lie down to facilitate the birth. It is typically only after the horse has lain down that a human must be present to supervise the birth in process.

Other animals may experience similar difficulties in birthing and/or need to be monitored as to whether they are down. For example, horses suffering from colic may need to be monitored so that they do not lie down and roll, thus disturbing their internal organs and allowing gangrene to become present.

Thus, there remains a need for a system that monitors whether an animal is standing.

SUMMARY OF THE INVENTION

The present invention comprises a system with sensors that use infrared light beams criss-crossing a containment area for an animal at a predetermined height. When the animal is standing, at least one of the light beams is interrupted, and a sensor detects that interruption. As long as the animal remains standing, the interruption is present and an individual desiring to monitor the animal may be reassured that the animal is standing.

When the animal lies down, the light beams reach the sensors without interruption and the individual monitoring the animal may be alerted as to the fact that the animal is no longer standing. A control system may include a timer such that if the animal sits and then stands within a predetermined amount of time, no alert is generated.

DETAILED DESCRIPTION OF THE DRAWINGS

Figure 1:
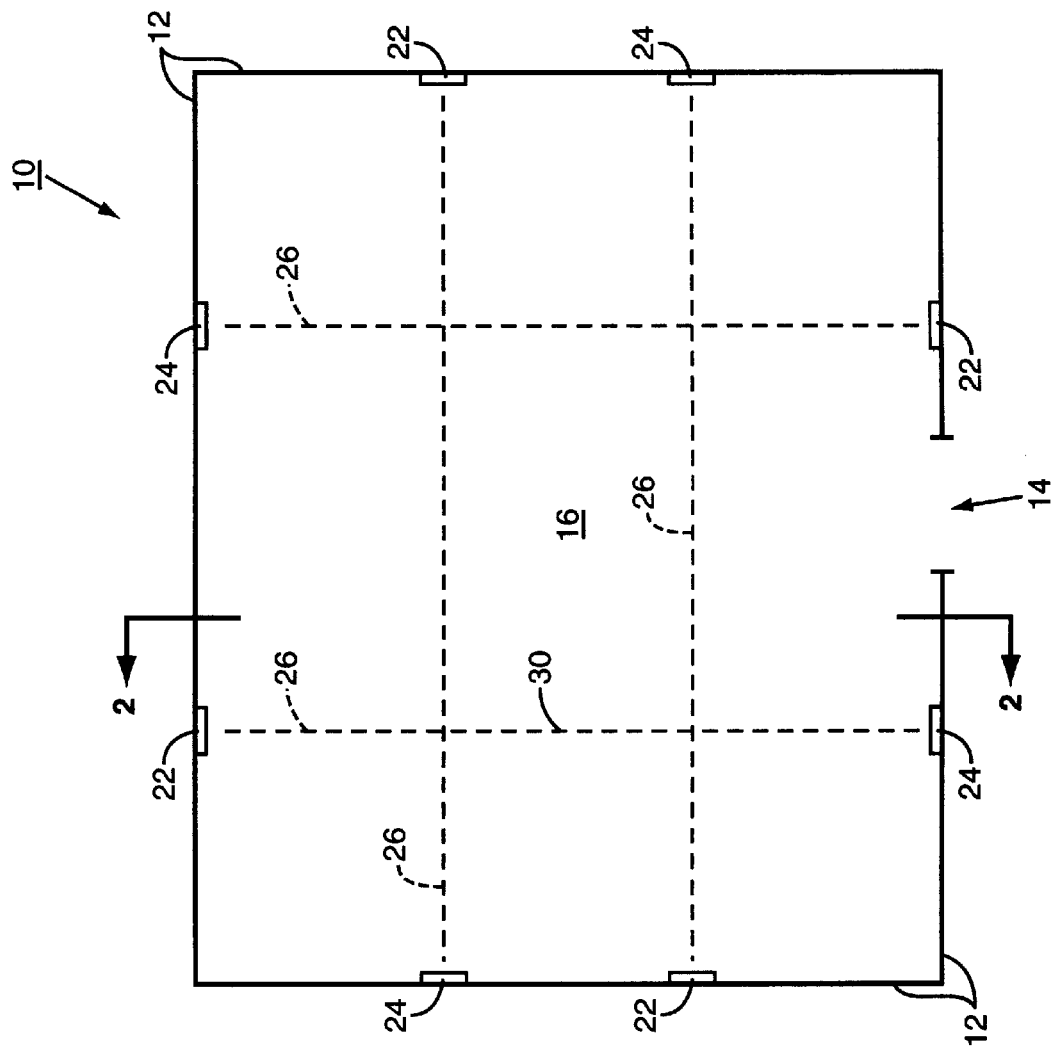
FIG. 1 is a top schematic view of an animal containment area according to one embodiment of the present invention.

FIG. 1 illustrates an animal containment area, such as a stall 10. Stall 10 includes walls 12 that are oppositely positioned one from another as is conventional. One wall 12 may comprise a door 14. Further, stall 10 may comprise a floor 16 and may contain an animal 18, such as a horse (FIG. 2).

Figure 2:
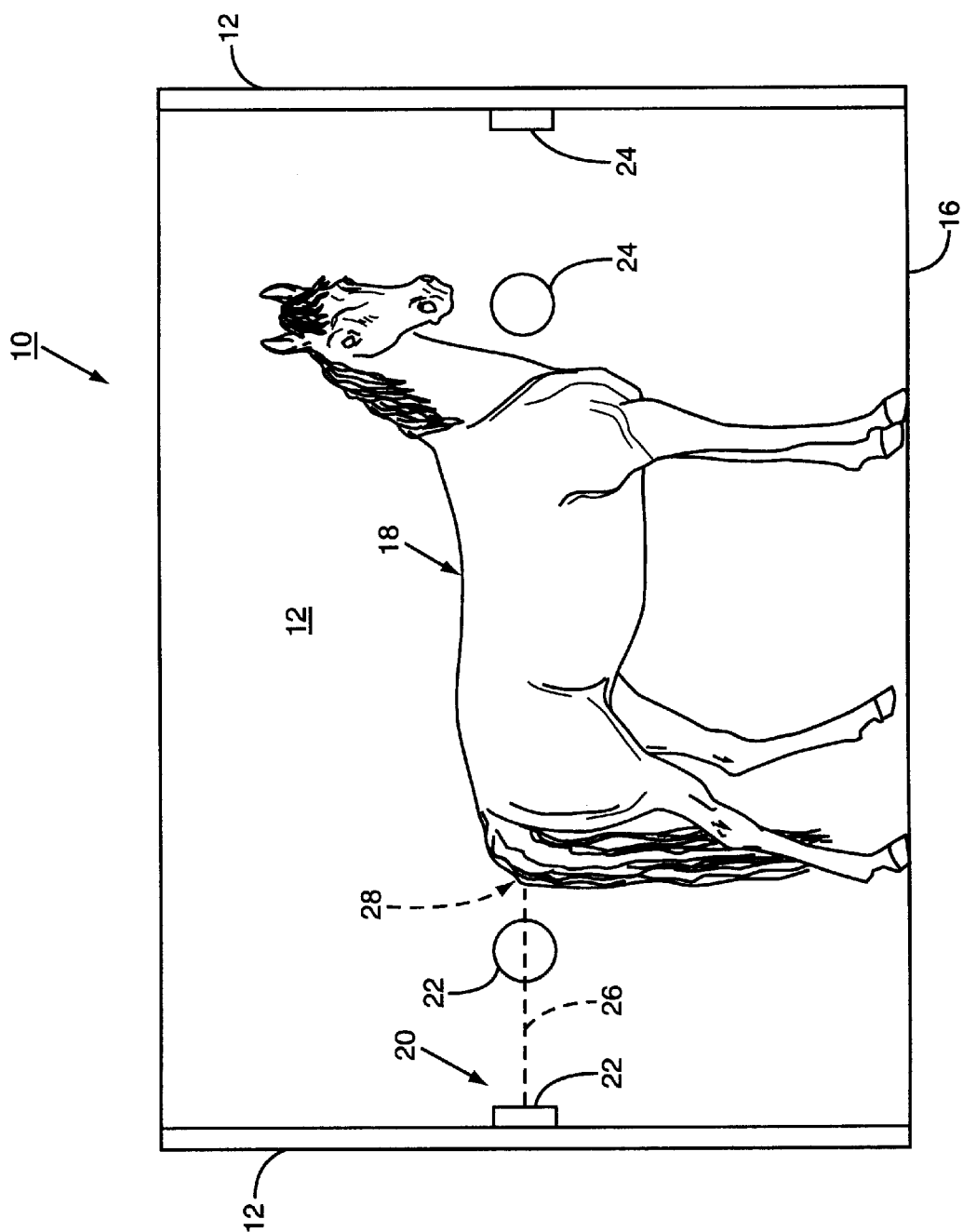
FIG. 2 is a side cross-sectional view of the animal containment area of FIG. 1 along lines 2—2 with an animal positioned therein in an upright, standing position.
Figure 3:
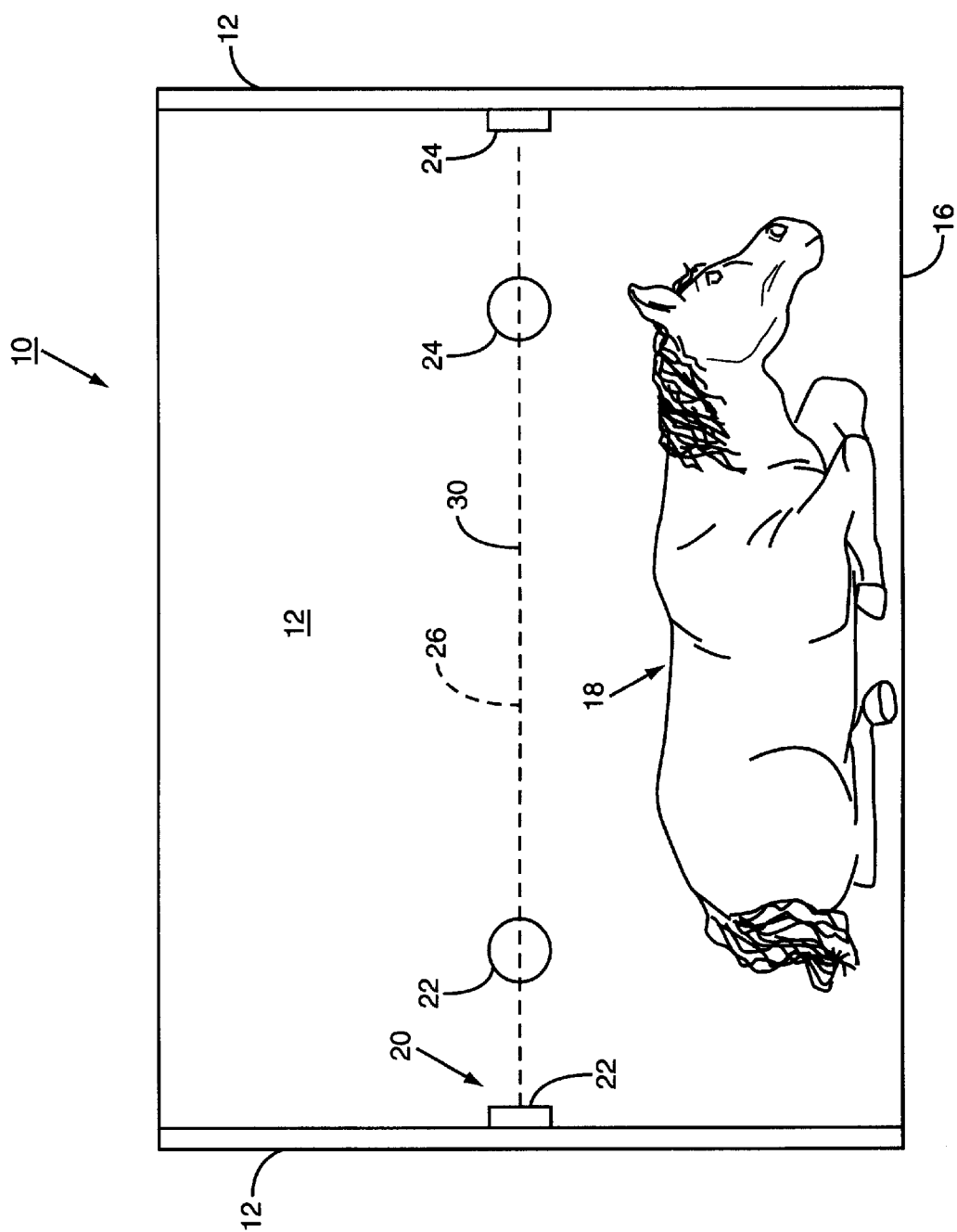
FIG. 3 shows the animal containment area of FIG. 2 with the animal in a non-standing position.

Sensing system 20 is illustrated in FIGS. 2 and 3 and comprises, in an exemplary embodiment, a plurality of light-emitting transmitters 22, light-receiving sensors 24, with light paths 26 extending there between. In one embodiment, the transmitters 22 and sensors 24 are positioned forty-six inches above the floor 16. Further, either a transmitter 22 or sensor 24 is positioned one for every four horizontal feet of wall 14. Other arrangements may also be used depending on the size of the containment area, the size and height of the animal 18 or other concerns. While only one transmitter 22 and one sensor 24 are shown on each wall 12, it should be appreciated that multiple transmitters 22 and sensors 24 may be positioned on each wall, and even in the corners such that the light paths 26 stretch diagonally across the stall 10. It should be appreciated that the transmitter 22 and sensors 24 can be supported on a free standing unit that can be used in a stall, pasture area, or any other area. Denser concentrations of transmitters 22 and sensors 24 provide a low probability of a false alarm as explained below. Likewise, while in the exemplary embodiment it is assumed that the transmitters 22 and sensors 24 are infrared light emitting transmitters and sensors respectively, other forms of electromagnetic radiation could also be used such as visible light, acoustic frequencies, microwave, ultraviolet, or the like as needed or desired. Note further, for the purposes of the present invention, electromagnetic radiation includes acoustic signals that do not fall within the traditional definition of an electromagnetic signal, such as those generated with an audio speaker.

As better illustrated in FIG. 2, the animal 18 may create interruptions 28 within the light path 26. Alternatively, when the animal 18 is lying down, an unbroken path 30 may exist between the transmitters 22 and the sensors 24 (FIGS. 1 and 3). Sensors 24 detect when the electromagnetic radiation from the oppositely positioned transmitters 22 is uninterrupted. The presence of an interruption in at least one of the transmitter 22-sensor 24 pairs may be used to infer that the animal 18 is standing. In an exemplary embodiment, the transmitters 22 send a modulated electromagnetic signal, and the sensors 24 discriminate for this modulated signal. This helps preclude false positive detections by sensors 24.

Figure 4:
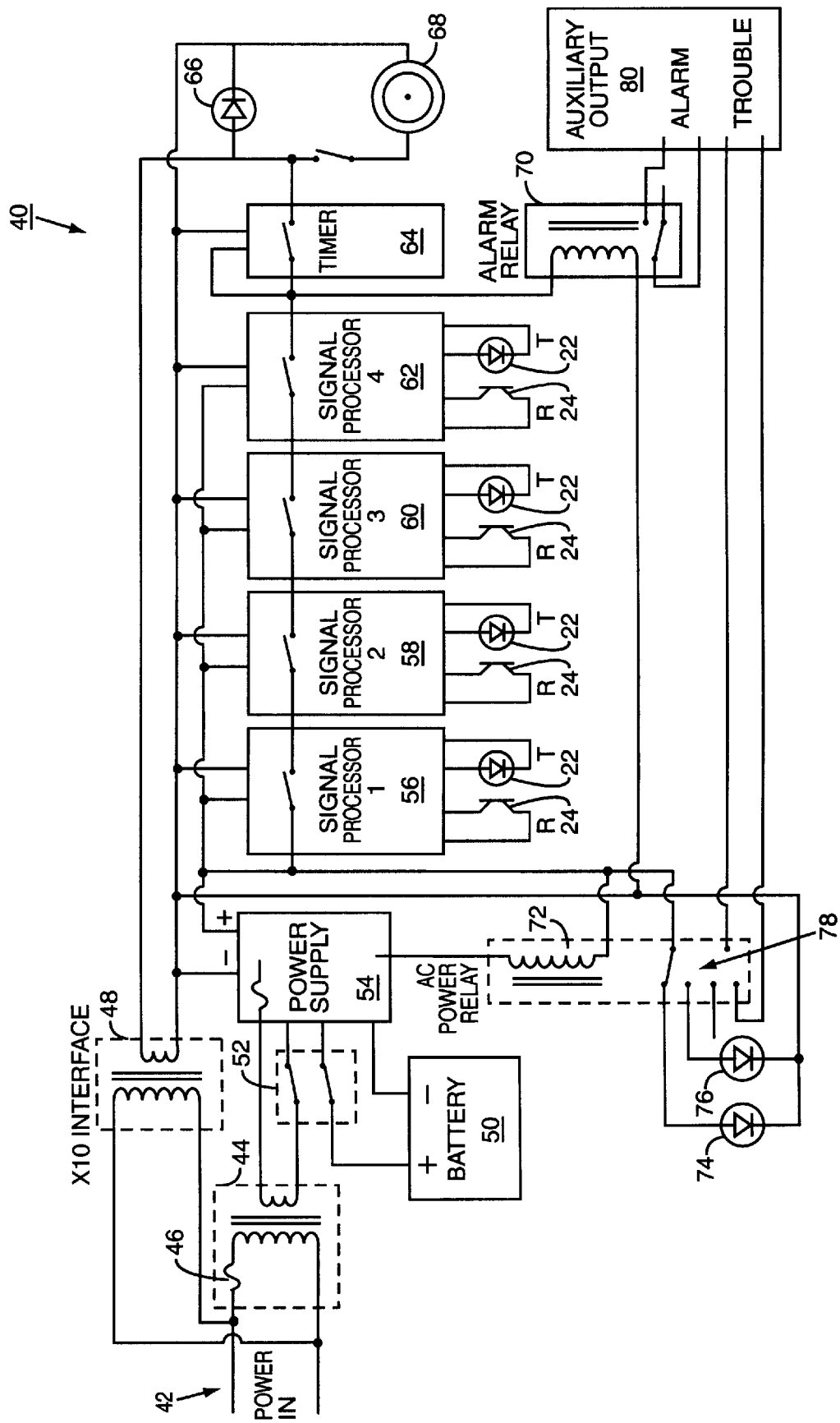
FIG. 4 is a schematic of the components of the system according to one embodiment of the present invention.

The electrical schematic 40 is illustrated in FIG. 4. A conventional AC power cable is provided generally at 42 and passes to two transformers. First transformer 44 comprises a fuse 46 and steps down the power to a desired level as is well understood. Second transformer 48 comprises an X10 interface as is likewise well understood. The X10 interface allows the sensing system 20 to interface with a conventional power grid such that dedicated wires are not required between remotely positioned elements. Specifically, the X10 interface puts a modulated signal back out the plug of the sensing system and into the socket that supplies power to the sensing system 20. Devices such as a chime or the like may be plugged into other sockets that share a common power source and detect the modulated signal for alarm emission or the like.

A battery 50 may provide a backup power supply in the event of power failure. In an exemplary embodiment, battery 50 may last twenty-four hours. If needed, a more efficient or larger battery may be used for greater power demands. Switch 52 may be a main power switch that turns on and off sensing system 20. Power supply 54 may be a conventional power supply such as are commonly found in computers or the like. Power supply 54 may further recharge the battery 50 if needed or desired. A fuse (shown, but not numbered) may be positioned therein.

Signal processors 56, 58, 60, and 62 may each control a transmitter 22-sensor 24 pair and process the presence or absence of a signal from the sensor 24. In an exemplary embodiment, signal processors 56, 58, 60, and 62 comprise PULNEX PHOTOELECTRIC BEAM SENSOR units. If the sensor 24 has no signal from its corresponding transmitter 22, then that is an indication that the light path 26 (FIGS. 1–3) has an interruption 28. If a signal is detected, the switch (shown, but not labeled) within the respective signal processor is closed. As long as one of the signal processors 56, 58, 60 or 62 detects such an interruption, it may be inferred that the animal 18 is standing. However, if all the signal processors 56, 58, 60, and 62 detect unbroken paths 30, the sensing system 20 may infer that the animal 18 is lying down. In the schematic of FIG. 4, only when all four signal processors 56, 58, 60, and 62 have closed their respective switches will current pass through the signal processors 56, 58, 60, and 62 to sound an alarm as detailed below.

It is possible that the animal 18 lies down and stands back up. Alternatively, the animal 18 may back itself into a region of the containment area that is not covered by light paths 26, but then moves out of that "dead" region. To prevent such instances from registering as an animal down situation, a timer 64 may be used in the sensing system 20 that sets a predetermined threshold before an alarm is generated. Specifically, the timer 64 may have a threshold of thirty seconds, a minute, two minutes, five minutes, or other time length, that if each signal processor 56, 58, 60, and 62 detects an unbroken path 30, an alarm is generated.

Alarms may be generated using a visual alarm such as an LED 66, an audible alarm such as horn 68, or the like as needed or desired. An unlabeled switch allows the horn 68 to be silenced if desired. These alarms 66, 68 work well if someone is sleeping proximate the animal containment area. However, it may also be desirable to have a remote alarm generation capability. The present invention also includes such a capability. An alarm relay 70 may be connected to the power supply 54 and the timer 64 and provide an output signal to an auxiliary alarm and trouble indicator box 80. Note that alarms may be positioned upstream or downstream of the timer 64. Thus, some alarms may only be generated after the timer 64 has passed a predetermined amount of time without an interruption; other alarms may sound immediately. For example, in the embodiment illustrated, the remote alarms are passed through alarm relay 70 immediately.

Power supply 54 may also power an AC power relay 72 that controls an AC power LED 74 showing that the device is turned on, a trouble LED 76, or other indicator function lights as needed or desired. When power is lost from the power in 42, the trouble LED 76 may illuminate. Switch 78 comprises a part of the AC power relay 72 as is well understood. If switch 78 turns to illuminate trouble LED 76, a signal may also be sent to auxiliary alarm and trouble indicator box 80.

Auxiliary alarm and trouble indicator box 80 may take a number of different forms depending on the needs of the users. A phone call may be placed to a prestored phone number and, upon answering of the phone, the answerer may hear a prerecorded message indicating an animal is down. Alternatively a pager may be phoned and an alphanumeric message provided to the recipient. Still further, a remote horn or light may be actuated to alert a user as to the condition of the animal 18. Other possibilities also exist.

The present invention may also be adapted such that multiple stalls 10 may be monitored by a single sensing system 20. In such an instance, a microcontroller may be used to control the various signal processors as needed or desired. The alarms may become more sophisticated too. Indications as to which stall 10 had the down animal are possible.

As an example of how the present invention works, an animal 18 (a horse) is positioned in a stall 10 and sensing system 20 is turned on with the appropriate power supplied thereto. An audible and a visual alarm are plugged into a socket in a tack room with the appropriate X10 interface. The sensing system 20 may further have a housing around the signal processors 56, 58, 60 or 62 with LEDs 74, 76, and alarms 66 and 68 positioned thereon. Further alarm relay 70 is connected to an auxiliary output 80 that places a call to a pager number.

The horse 18, when standing, creates one or more interruptions 28 in the light paths 26. As long as one of the signal processors 56, 58, 60 or 62 fails to detect a modulated signal at the respective sensor 24, one of the switches in the signal processors 56, 58, 60 or 62 will be open and no current will flow to the alarm generating mechanisms. The horse may move about the stall 18, but as long as the signal processors 56, 58, 60 or 62 detect one interruption, no alarm will be generated.

When the horse 18 lays down, all the light paths 26 are uninterrupted and each signal processor 56, 58, 60 or 62 closes its respective switch. Current flows through the signal processors 56, 58, 60 or 62 and causes timer 64 to begin counting. After a predetermined amount of time has passed with all the sensors 24 reporting uninterrupted light paths 26, the timer outputs a signal that causes the X10 interface to send a signal to the chime in a remote location; generate local alarms with alarms 66 and 68; and call the pager number through the alarm relay 70. The auxiliary alarm and trouble indicator box 80 may be equipped with an automated dialer that has a phone number for a veterinarian programmed thereinto. Upon receipt of the signal from the timer 64, the auxiliary alarm and trouble indicator box 80 initiates its call sequence and calls the pager.

For the purposes of the present invention, the terms "laying down" and "sitting" are to be construed as synonymous. These terms are to be construed as requiring the animal to be a in a position below the signal or light beam or beams of the sensing system 20. Further, for the purposes of the present embodiment, a controller is meant to be construed as covering one or more signal processors that synthesize the information from the sensors 24.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of determining when a mare has assumed a foaling position within a stall, comprising a) directing one or more electromagnetic beams in a path across the stall where the mare is located;
b) directing the one or more electromagnetic beams horizontally over an area of the stall at a height above a foaling position such that when the mare is standing in the stall at least one electromagnetic beam will be interrupted;
c) continuously directing the one or more electromagnetic beams across the stall;
d) detecting that the mare has assumed the foaling position by detecting that all of the electromagnetic beams have become uninterrupted because the mare is not standing in the path of the one or more electromagnetic beams; and
e) generating a signal apprising that the mare has assumed the foaling position.

2. The method of claim 1 including directing the signal to a location remote from the stall where the mare is located in response to determining that the electromagnetic beam or beams are uninterrupted.

3. The method of claim 1 including directing the one or more electromagnetic beams across the stall at a height greater than 40 inches above a floor of the stall.

4. The method of claim 1 including generating the signal apprising that the mare has assumed the foaling position only after the electromagnetic beam or beams remain uninterrupted for a period of time greater than two minutes.

5. The method of claim 1 including positioning a plurality of infrared light emitting transmitters on at least two walls forming a part of the stall; and positioning a plurality of infrared light detecting sensors on opposite ones of said walls in a number equal to said infrared light emitting transmitters; and detecting infrared light emitted by said transmitters.

6. The method of claim 5 including directing input signals from said sensors to a controller and determining whether the mare is standing or in the foaling position based on whether there is an interruption of infrared light received by at least one of the sensors.

* * * * *